United States Patent Office 3,707,509
Patented Dec. 26, 1972

3,707,509
PROCESS FOR THE PREPARATION OF A CATALYST OF THE PLATINUM/ALUMINA TYPE FOR REFORMING AROMATIZATION AND ISOMERIZATION
Eugenia Georgescu, Ion Ghejan, Victor Bucur, Teodora Mazare, Ion Zirna, and Elena Lygia Popescu, Ploesti, Andrian Budu, Bucharest, and Bujor Olteanu, Traian Mircea Filotti, and Marius Aurel Barbul, Ploesti, Rumania, assignors to Institutul de Cercetari Pentru Prelucrarea Titeiului, Ploiesti, Rumania
No Drawing. Filed Apr. 1, 1970, Ser. No. 24,846
Claims priority, application Rumania, Apr. 8, 1969, 59,668
Int. Cl. B01j 11/78
U.S. Cl. 252—441                              3 Claims

ABSTRACT OF THE DISCLOSURE

A process for producing platinum-on-alumina catalyst for the reforming, aromatization and isomerization of paraffinic hydrocarbons, comprising:
(a) Treating an alumina support with chloroplatinic acid or other soluble platinum-group compound in the presence of carbonic acid;
(b) Maintaining the platinum-containing support in a reducing or inert medium at a temperature of 300 to 500° C. for 8 to 15 hours;
(c) Halogenating the catalyst in a reducing or inert medium; and
(d) Effecting an oxidizing treatment upon the catalyst.

---

The present invention relates to a process for the preparation of a catalyst of the platinum on alumina type for the reforming and aromatization of gasoline and the isomerization of $C_5$ to $C_7$ paraffins.

Processes for the preparation of the Pt on $Al_2O_3$ catalyst are known, in which, in order to achieve a good dispersion of the platinum on the alumina support and to provide the catalyst with a supplemental acidity, the active support is contacted with solutions containing a combination of platinum and an electrolyte such as hydrochloric acid, nitric acid or mixtures of these latter, acetic or haloacetic acid.

The disadvantage of these processes is that the extraction yield of platinum metal from the impregnation solutions is relatively low (about 60% by weight), thus resulting in significant amounts of residual or byproduct solutions, the recovery or replenishment of which requires supplemental equipment, and the concentration of which leads to an increase of the electrolyte content; however the concentration of the electrolytes in the recycled impregnation solutions cannot exceed a certain limit without introducing drawbacks into the impregnation operation, as a result of the accumulation of impurities.

A process for impregnating the support with carbon dioxide is known too.

This process has the disadvantage of being too complicated from the technical point of view, and of not allowing the preparation of a catalyst having sufficient acidity for the processes of reforming, aromatization and isomerization.

The acidification of this type of catalyst is achieved by means of liquid-phase treatments with various halide compounds applied both to the hydrated or activated support and to the catalyst.

A disadvantage of these processes is found in the fact that the halogen has a low stability, since it does not remain bonded at high temperatures approaching those used in the discussed industrial processes.

A process for the halogenation of fresh or used catalysts is also known, in which the catalyst is saturated with water vapor by entraining the latter with air, the catalyst being subsequently chlorinated in an oxidizing medium. Chlorination in the presence of water vapor creates, however, a strongly corrosive medium which can attack the equipment of the respective plants.

In other vapor phase halogenation processes, it is recommended to perform the chlorination in oxidizing or inert media, using sublimed alkane halides.

These catalysts, having a high halogen content, can be used only in low-temperature isomerization processes, because at high temperatures they are not selective, have insufficient stability, and are characterized by high corrosion potentials because of the gradual loss of halogen and the formation of hydrochloric acid.

Processes are also known, in which the halogenation in a reducing medium is recommended, using for example hydrochloric acid, without subsequent oxidizing treatment which would favor the formation of a Pt-chlorine-alumina complex. It is known that by bringing the catalyst into a reducing medium, at high temperatures, the reduction of the active element occurs: the use of the halogenating treatment without following it with an oxidizing treatment does not produce an improvement in the dispersion of platinum and does not lead to a maximum surface for platinum and to a high level of activity.

The process according to the invention eleminates the abovementioned disadvantages in that the metal function of the catalyst is provided by depositing on the support a soluble product of a platinum metal of Group VIII of the Periodic System, preferably the hexa-chloroplatinic acid, in the presence of a competitor exerting no influence on the acid function, preferably carbonic acid, in such an amount as to give a platinum metal content in the catalyst of from 0.1 to 1% by weight. The acid function is obtained and controlled by a succession of treatments in the gaseous phase which comprise: maintaining of the impregnated support in an inert or reducing atmosphere, at atmospheric pressure and temperatures of from 300° to 450° C. for 8 to 15 hours, with a velocity of gas flow of from $1 \times 10^{-2}$ to $5 \times 10^{-2}$ nm.$^3$/h.kg. (STP) of catalyst; the halogenation in an inert or reducing medium with halogen or a halogenated compound, preferably an alkane halide with 1 to 6 carbon atoms per molecule, with an atomic ratio of chlorine:carbon lower than 2:1, at atmospheric pressure and temperatures of from 350° to 450° C., at a halide vapor partial pressure of from 1 to 200 mm. Hg, for 1 to 5 hours, so that the halogen content of the catalyst shall be of 0.1 to 2% by weight, preferably 0.5 to 1.2% by weight, followed by an oxidizing treatment with an oxygen-containing gas, preferably air, at atmospheric pressure and temperatures of from 350° to 450° C., for 2 to 10 hours, with a velocity of gas flow of from 1 to 5 nm.$^3$/hour.kg. (STP) of catalyst.

The application of the process according to the invention is illustrated in the following two examples:

EXAMPLE 1

A quantity of 100 g. of gamma and eta active alumina, in the form of extruded granules of following size: 1.3 mm. diameter, 4 to 6 mm. length, having a mechanical cutting resistance of 2.8 kg./mm. of diameter, was introduced into 300 ml. of hexa-chloroplatinic acid solution having a concentration of 0.116 g./100 ml., then carbon dioxide was bubbled through the impregnation solution in such a manner that during the entire impregnation operation the solution contains carbon dioxide. The operation was effected at room temperature, for 4 hours, the extruded granules being then separated from the solution by centrifuging. Subsequent drying of the extruded granules at the temperature of 110° C. followed for 4 hours, then calcining of the granules by means of air circulation for 4 hours at 55° C. The extraction yield of platinum from the impregnating solution was 99.8% by weight.

The impregnated and calcined extruded granules were subjected to a gaseous phase chlorination treatment, in a reducing medium, in the following way: the extruded granules were maintained for 8 hours in a hydrogen atmosphere, at atmospheric pressure, at the temperature of 470° C., with a velocity of hydrogen flow of $3 \times 10^{-2}$ nm.$^3$ hydrogen/h.kg. of catalyst. Subsequently, the extruded granules were chlorinated in a hydrogen medium, at atmospheric pressure and a temperature of 400° C., using dichloroethane at a partial pressure of 40 mm. Hg. Chlorination was carried on for 60 minutes. After purging with nitrogen, the extruded granules were oxidized with air at a temperature of 450° C., for 10 hours, at atmospheric pressure. Velocity of air flow was 2.2 nm.$^3$ air/hour.kg. of catalyst (STP). The catalyst A was obtained, having the physical, chemical and structural characteristics shown in Table 1.

TABLE 1.—CHEMICAL AND STRUCTURAL CHARACTERISTICS OF CATALYST A

| | |
|---|---|
| Platinum content, percent by weight | 0.347 |
| Soluble platinum proportion, percent | 80 |
| Chlorine content, percent by weight | 0.69 |
| Na$_2$O content, percent by weight | 0.011 |
| Fe$_2$O$_3$ content, percent by weight | 0.016 |
| Chlorine content after its stabilization in the process, percent by weight | 0.54 |
| Specific surface (BET), m.$^2$/g. | 229 |
| Pore volume, cm.$^3$/g. | 0.406 |
| Pore distribution, percent: | |
|   0 to 25 A. | 31 |
|   25 to 50 A. | 60 |
|   50 to 100 A. | 4 |
|   100 to 300 A. | 5 |
| Mechanical cutting resistance, kg./mm. of diameter | 2.5 |

The activity of catalyst A was determined in a micro-pilot plant by reforming a hydrofined benzine cut, with a distillation range of 130° to 190° C., aromatic hydrocarbon content of 14.0% by vol., naphthenic hydrocarbon content of 22% by vol., and RON[1] of 46, under the following conditions: pressure 40 atm., volumetric rate of flow 2 vol./vol.h., molar ratio hydrogen: feed stock 12:1, and at two levels of temperature 490° C. and respectively 500° C. Criterion for the appreciation of the catalyst was RON, the content of aromatics of the reformed product, as well as the yield in depentanized liquid product.

The results of the catalyst A activity, at the two temperature levels, are the following:

| Temperature, ° C | 490 | 500 |
|---|---|---|
| Yield in depentanized liquid product, percent by w | 85.9 | 82.5 |
| Aromatics, percent by w | 54 | 55.5 |
| RON (without ethylation) | 86 | 90 |

The marked aromatizing character of this catalyst was made evident by determining the n-heptane conversion in a microreactor plant coupled with a gas chromatograph, under the following conditions: pressure 16 atm., temperature 425° C., and feeding rate $4.75 \times 10^{-6}$ mole nC$_7$/sec. The catalyst A, tested under these conditions, presented the following activity characteristics:

| | |
|---|---|
| A.R. (activity rating of catalyst for nC$_7$ conversion) $\times 10^6$ moles nC$_7$/sec.g. of catalyst | 6.45 |
| S iC$_7$ (selectivity iC$_7$), percent | 34.4 |
| S$_T$ (selectivity toluene), percent | 34.0 |
| S$_{C_1-C_4}$ (selectivity low paraffins) | *19.5 |

*The difference up to 100% is made of C$_5$–C$_6$ hydrocarbons.

[1] RON=Research Octane Number.

EXAMPLE 2

80 g. of a mixture of gamma and eta active alumina in the form of extruded granules, having a mechanical cutting resistance of 2.8 kg./mm. of diameter and same size as in Example 1, were introduced into 240 ml. of hexa-chloroplatinic acid solution having a concentration of 0.117 g./100 ml. of solution. The subsequent preparation was similar to that in Example 1. Extraction yield of platinum from the impregnation solution was 99.9% by weight. Chlorination of the extruded granules was also similar to that in Example 1, but using, however, a higher temperature, i.e. 430° C., during 120 minutes and at a partial dichloroethane vapor pressure of 30 mm. Hg. The other conditions were the same. The catalyst B was obtained, having the chemical and structural characteristics shown in Table 2.

TABLE 2.—CHEMICAL AND PHYSICAL-STRUCTURAL CHARACTERISTICS OF CATALYST B

| | |
|---|---|
| Platinum content, percent by weight | 0.349 |
| Soluble platinum proportion, percent | 97 |
| Chlorine content, percent by weight | 0.8 |
| Na$_2$O content, percent by weight | 0.011 |
| Fe$_2$O$_3$ content, percent by weight | 0.01 |
| Chlorine content after its stabilization in the process, percent by weight | 0.65 |
| Specific surface (BET), m.$^2$/g. | 201 |
| Pore volume, cm.$^3$/g. | 0.46 |
| Pore distribution, percent: | |
|   0 to 25 A. | 5 |
|   25 to 50 A. | 67 |
|   50 to 100 A. | 14 |
|   100 to 300 A. | 14 |
| Mechanical cutting resistance, kg./mm. of diameter | 2.2 |

For the appreciation of catalyst B, the same means were utilized for the determination of the activity: conversion of n-heptane under the conditions shown in Example 1 as well as the reforming under operation conditions of a hydrofined benzine cut as shown in Example 1.

The isomerization qualities of catalyst B have been made evident by the value of the selectivity for iso-heptane, obtained in the conversion of n-heptane. Under the conditions shown in Example 1, the following data were obtained for the activity:

| | |
|---|---|
| A.R. $\times 10^6$, moles nC$_7$/sec.g. of catalyst | 6.4 |
| S iC$_7$, percent | 40.7 |
| S$_T$, percent | 29.8 |
| S$_{C_1-C_4}$, percent | 15.5 |

Owing to the conditions of halogenation applied and to the content of halogen deposited on catalyst B, the isomerization function of the latter was emphasized, while the aromatization function was maintained at a high level.

The results obtained in the reforming process, at the two temperature levels, were the following:

| Temperature, ° C | 490 | 500 |
|---|---|---|
| Yield in depentanized liquid product, percent by w | 80.3 | 75 |
| Aromatics, percent by vol | 64 | 70.5 |
| RON (without ethylation) | 94.2 | 97 |

From the data obtained in the conversion of n-heptane for the two catalysts presented in Examples 1 and 2, it may be seen that the halogenation conditions applied to catalyst B (Ex. 2) have given the latter a preponderantly isomerizing character, the equilibrium of selectivities for iso-heptane and respectively for toluene being displaced in the sense of the increase in the selectivity for iso-heptane. In Example 1, the selectivity for iso-heptane was 34.4% while in Example 2 it was 40.7%. The content of halogen in Example 1 was 0.69%, and in Example 2 0.8%.

The halogen being extremely efficient, the increase in halogen content leads to very active isomerization catalysts, these catalysts presenting at the same time, under the conditions of the reforming and aromatization processes, particularly high activities. Thus, the catalyst B presents, at the two temperature levels, RON of 94 and of 97, respectively.

In order to demonstrate the efficiency of the catalysts prepared according to the invention, in comparison with catalysts prepared by impregnation with acid competitors, such as hydrochloric and nitric acids, without a halogenation in the gaseous phase, 100 g. of a mixture of active eta and gamma alumina were processed, contacting the mixture with a hexa-chloroplatinic acid solution containing as competitors hydrochloric acid and nitric acid. The quantity of solution was in a 6:1 ratio as against the amount of catalyst, the concentrations of the components in 100 ml. of solution being the following: 0.097 g. Pt; 0.2 g. hydrochloric acid and 1.5 g. nitric acid. The impregnation of the extruded alumina granules was carried out with stirring of the solution for 3 hours at room temperature. Extraction yield of platinum from the impregnating solution was 56.7% by weight. The separation, drying and calcining of the extruded granules were performed as in Example 1.

The obtained catalyst had, after calcination, a platinum content of 0.377% by weight, a chlorine content of 0.49% by weight, and a chlorine content after stabilization in the process of 0.11% by weight.

At the reforming of a hydrofined benzine cut of distillation range 130° to 190° C., with naphthenes content of 34% by weight and a RON of 45, under the same conditions as in Example 1, the catalyst presented an initial activity corresponding to RON 83.7 at 490° C. and RON 90.4 at 500° C.

Another catalyst, impregnated by the same procedure with the competitors hydrochloric acid and nitric acid, but the support being present in the form of a slurry of aluminium hydrates, was also treated with a diluted hydrofluoric acid solution of 0.0275 g./100 ml. of solution, so that the deposited hydrofluoric acid should represent 0.55% by weight as against $Al_2O_3$. The filtered slurry was brought to the required consistency for extrusion, then extruded through a 1.5 mm. diameter die, dried and calcined as in Example 1, then impregnated with the competitor's hydrochloric acid and nitric acid, as described above. Extraction yield of platinum from the impregnating solution was 64.8% by weight. The obtained catalyst had a platinum content of 0.405% by weight, an initial content of 0.4% by weight of fluorine and 0.42% by weight of chlorine, and after stabilization in the process, a content of 0.3% by weight of fluorine and 0.09% of chlorine, and presented an activity expressed in RON of 83 at 490° C. and respectively of 86.1 at 500° C. Although the catalyst contained fluorine and chlorine in about a 0.8% ratio, its activity was relatively low.

The process and the catalyst according to the invention present the following advantages:

Catalysts having a high activity for a low content of halogen are obtained;

The fixation of halogen in a more stable way on the support surface is provided by the complex action of the halogen both on the support and on the active substance;

The deposition of halogen is achieved in a selective way;

By associating the deposition of the halogens with the way of depositing the active element as described in Examples 1 and 2, on the one hand the preparation of a high activity catalyst and on the other the almost complete extraction—above 99%—of the active element are achieved;

The treatments applied to the support do not affect the mechanical resistance of the latter.

What is claimed is:

1. A process for the preparation of acidic platinum-on-alumina catalyst for the re-formation, aromatization and isomerization of paraffinic hydrocarbons, said process comprising the steps of:

(a) depositing a platinum compound upon alumina from a solution of hexachloroplatinic acid in the presence of carbonic acid;

(b) heating the platinum-carrying alumina in a reducing or inert gaseous medium at a temperature of 300 to 450° C. for a period of 8 to 15 hours with a flow rate of the medium between $1 \times 10^{-2}$ and $5 \times 10^{-2}$ m.³/hour.kg. (STP) of the platinum-carrying alumina;

(c) thereafter halogenating the platinum-carrying alumina in a reducing gaseous medium with a haloalkane having 1 to 6 carbon atoms and an atomic ratio of chlorine:carbon lower than 2:1 at a temperature of 350° to 450° C. at a partial vapor pressure of the haloalkane between 1 and 200 mm. Hg for a period of 1 to 5 hours; and (d) effecting an oxidizing treatment upon the platinum-carrying alumina of step (c) at a temperature of 350° C. to 450° C. over a period of 2 to 10 hours with an oxygen-containing gas at a flow rate of the latter between substantially 1 and 5 m.³/h. (STP)/kg. of the catalyst.

2. The process defined in claim 1 wherein the gaseous medium in steps (b) and (c) is hydrogen.

3. The process defined in claim 1 wherein said haloalkane is dichloroethane.

References Cited

UNITED STATES PATENTS

| | | | |
|---|---|---|---|
| 3,248,320 | 4/1966 | White et al. | 208—139 |
| 3,216,923 | 11/1965 | Haensel | 252—441 X |
| 3,000,838 | 9/1961 | Michael | 252—441 |

PATRICK P. GARVIN, Primary Examiner

U.S. Cl. X.R.

208—139; 252—442